United States Patent
Kumai

(10) Patent No.: US 10,386,557 B2
(45) Date of Patent: Aug. 20, 2019

(54) OPTICAL ELEMENT, METHOD FOR MANUFACTURING THE SAME, AND ELECTRONIC APPARATUS

(71) Applicant: Seiko Epson Corporation, Tokyo (JP)

(72) Inventor: Yoshitomo Kumai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/955,589

(22) Filed: Apr. 17, 2018

(65) Prior Publication Data

US 2018/0239071 A1    Aug. 23, 2018

Related U.S. Application Data

(62) Division of application No. 15/195,385, filed on Jun. 28, 2016, now Pat. No. 9,977,168.

(30) Foreign Application Priority Data

Aug. 10, 2015  (JP) ................. 2015-157969

(51) Int. Cl.
```
G02B 5/30      (2006.01)
B29C 59/00     (2006.01)
B29D 11/00     (2006.01)
H04N 9/31      (2006.01)
G02F 1/1335    (2006.01)
G02B 1/10      (2015.01)
```
(Continued)

(52) U.S. Cl.
CPC .......... *G02B 5/3058* (2013.01); *B29C 59/007* (2013.01); *B29D 11/00788* (2013.01); *G02B 1/10* (2013.01); *G02B 5/003* (2013.01); *G02B 5/3041* (2013.01); *G02F 1/133536* (2013.01); *H04N 9/3105* (2013.01); *H04N 9/3167* (2013.01); *B29K 2995/0026* (2013.01); *B29L 2011/00* (2013.01); *G02F 2001/133548* (2013.01)

(58) Field of Classification Search
None
See application file for complete search history.

(56) References Cited

U.S. PATENT DOCUMENTS

2011/0310328 A1    12/2011  Kumai
2012/0105745 A1    5/2012   Kumai
(Continued)

FOREIGN PATENT DOCUMENTS

JP    2012-098469 A    5/2012
JP    2012-103490 A    5/2012

OTHER PUBLICATIONS

Non-Final Office Action received in U.S. Appl. No. 15/195,385, dated Aug. 24, 2017.
(Continued)

*Primary Examiner* — Shamim Ahmed
(74) *Attorney, Agent, or Firm* — ALG Intellectual Property, LLC

(57) ABSTRACT

An optical element includes a substrate, a plurality of reflection layers disposed on one side of the substrate, an absorbing layer disposed on a side of the reflection layers that is opposite to the substrate, and an oxide film that covers the absorbing layer and portions between any two adjacent reflection layers. The reflection layers are arranged in a striped manner in plan view. The oxide film is made of an oxide of a material contained in the absorbing layer.

11 Claims, 12 Drawing Sheets

(51) Int. Cl.
*G02B 5/00* (2006.01)
*B29L 11/00* (2006.01)

(56) References Cited

U.S. PATENT DOCUMENTS

2013/0286358 A1* 10/2013 Takahashi ............ G02B 5/3058
353/20
2014/0063467 A1* 3/2014 Takahashi ............ G02B 5/3058
353/20

OTHER PUBLICATIONS

Notice of Allowance and Notice of Allowability received in U.S. Appl. No. 15/195,385, dated Jan. 19, 2018.

* cited by examiner

OPTICAL ELEMENT, METHOD FOR MANUFACTURING THE SAME, AND ELECTRONIC APPARATUS

The present application is a divisional application of U.S. patent application Ser. No. 15/195,385 filed Jun. 28, 2016 (issued as U.S. Pat. No. 9,977,168), which claims priority from Japan Patent Application No. 2015-157969 filed Aug. 10, 2015, the entire disclosure of which is hereby incorporated by reference in its entirety.

BACKGROUND

1. Technical Field

The present invention relates to an optical element, a method for manufacturing the same, and an electronic apparatus.

2. Related Art

For example, in a projector that is a type of electronic apparatus, optical elements are disposed at each side of a liquid light valve. The optical element may be a wire grid polarization element disclosed in JP-A-2012-98469. The polarization element includes a transparent substrate and a metal grid disposed over the substrate in such a manner that the ribs or bar members of the grip are arranged with a pitch smaller than the wavelength of light used.

Since this grid is made of an inorganic material, the polarization element is less likely to deteriorate than polarization elements using an organic material, even if it is irradiated with light, and is thus useful for brighter liquid crystal projectors which are increasingly in demand.

For example, in a process for manufacturing a polarization element, a multilayer composite is formed on a substrate by forming an aluminum layer, a silicon oxide layer, and a silicon layer in this order on a substrate, and a resist pattern is formed in a striped manner on the composite. The multilayer composite is then etched at one time using the resist pattern as a mask, and is thus formed into a multilayer grid in a striped manner with a large aspect ratio in plan view.

Unfortunately, the grid has a multilayer structure with a large aspect ratio and the layers forming the multilayer structure have different etching rates. Consequently, the amount of etching is varied. If etching is intended to be performed up to the interface between the lowermost aluminum layer and the substrate, therefore, the etching must be performed allowing for variation in etching amount. Consequently, the side surfaces of the stripes of the multilayer structure are excessively etched, and the width of the stripes is reduced. Thus, it is difficult to form a small and fine polarization element.

SUMMARY

An advantage of some aspects of the invention is that it provides an optical element, a method for manufacturing the same, and an electronic apparatus as below.

Application 1

According to an aspect of the invention, there is provided an optical element including a substrate, a plurality of reflection layers on one side of the substrate in a striped manner in plan view, and an absorbing layer on the side of the reflection layers opposite the substrate, and an oxide film covering the absorbing layer and portions between any two adjacent reflection layers. The oxide film is made of an oxide of a material contained in the absorbing layer.

This structure is formed by forming the absorbing layer after forming the reflection layers. This process can reduce variation in etching amount resulting from the difference in etching rate between the materials compared to the case of forming the reflection layers and the absorbing layer at one time by etching. Accordingly, finely striped reflection layers can be formed. Consequently, contrast and brightness can be improved. Also, the oxide film is made of an oxide formed by oxidizing a material contained in the absorbing layer. This prevents the decrease in optical transmittance between the reflection layers.

Application 2

Preferably, the substrate has grooves therein between any two adjacent reflection layers, and the oxide film in part lies in the grooves.

This structure is formed by forming the absorbing layer after forming the reflection layers. This process can reduce variation in etching amount resulting from the difference in etching rate between the materials compared to the case of forming the reflection layers and the absorbing layer at one time by etching. Accordingly, finely striped reflection layers can be formed. Consequently, contrast and brightness can be improved.

Also, the oxide film is formed in the grooves. Consequently, the portions between the reflection layers are nearly transparent, and accordingly, the optical transmittance between the reflection layers does not decrease.

Application 3

Preferably, the optical element further includes a dielectric layer between each of the reflection layers and the absorbing layer.

In this structure, the dielectric layer between the reflection layers and the absorbing layer prevents the constituent elements in the reflection layers and the absorbing layers from diffusing mutually. Thus, fluctuation in performance of separating polarized light components, resulting from diffusion can be reduced.

Application 4

Preferably, the reflection layers contain at least one selected from the group consisting of aluminum, silver, copper, chromium, titanium, nickel, tungsten, and iron.

The reflection layers made of such a material allows an oxide film (dielectric layer) to be easily formed by thermal oxidation or the like.

Application 5

Preferably, the absorbing layer contains at least one selected from the group consisting of silicon, germanium, and chromium.

The use of such a material achieves an optical element capable of absorbing light, that is, having a low reflectance.

Application 6

Preferably, the dielectric layer is made of silicon oxide.

In this instance, the silicon oxide layer can be easily formed by thermal oxidation or the like.

Application 7

According to another aspect of the invention, a method for manufacturing an optical element is provided. The method includes forming a plurality of reflection layers on one side of a substrate such that the reflection layers are arranged in a striped manner in plan view, forming an absorbing layer so as to cover the one side of the substrate and the plurality of reflection layers, and forming an oxide film by oxidizing portions of the absorbing layer on the side of the reflection layers opposite the substrate, in part, and portions of the absorbing layer between any two adjacent reflection layers.

In this method, the absorbing layer is formed after forming the reflection layers. This process can reduce variation in etching amount resulting from the difference in etching rate between the materials compared to the case of forming the reflection layers and the absorbing layer at one time by etching. Accordingly, finely striped reflection layers can be formed. Consequently, contrast and brightness can be improved. Also, the oxide film formed between the reflection layers prevents decrease in optical transmittance between the reflection layers.

Application 8

Preferably, the method further includes forming grooves in the substrate between any two adjacent reflection layers after the step of forming the reflection layers, and part of the oxide film is formed in the grooves.

In this method, the absorbing layer is formed after forming the reflection layers. This process can reduce variation in etching amount resulting from the difference in etching rate between the materials compared to the case of forming the reflection layers and the absorbing layer at one time by etching. Accordingly, finely striped reflection layers can be formed. Consequently, contrast and brightness can be improved. Also, the oxide film is formed after the formation of the grooves performed after the formation of the reflection layers by oxidizing the material (film) defining the grooves. Consequently, the portions between the reflection layers are nearly transparent, and accordingly, the optical transmittance between the reflection layers does not decrease.

Application 9

According to still another aspect of the invention, a method for manufacturing an optical element is provided. The method includes forming a plurality of reflection layers on one side of a substrate such that the reflection layers are arranged in a striped manner in plan view, forming an absorbing layer so as to cover the one side of the substrate and the plurality of reflection layers, and removing the portions of the absorbing layer between any two adjacent reflection layers by etching.

In this method, the substrate is exposed between the reflection layers by removing the portions of the absorbing layer between the reflection layers. Consequently, the optical transmittance between the reflection layers is increased.

Application 10

Preferably, the method further includes forming a dielectric layer between the reflection layers and the absorbing layers.

In this method, the dielectric layer between the reflection layers and the absorbing layer prevents the constituent elements in the reflection layers and the absorbing layers from diffusing mutually. Thus, fluctuation in performance of separating polarized light components, resulting from diffusion can be reduced.

Application 11

Preferably, the reflection layers are formed of a material containing at least one selected from the group consisting of aluminum, silver, copper, chromium, titanium, nickel, tungsten, and iron.

The reflection layers made of such a material allows an oxide film (dielectric layer) to be easily formed by thermal oxidation or the like.

Application 12

Preferably, the absorbing layer is formed of a material containing at least one selected from the group consisting of silicon, germanium, and chromium.

The use of such a material achieves an optical element capable of absorbing light, that is, having a low reflectance.

Application 13

Preferably, the dielectric layer is formed of silicon oxide.

In this instance, the silicon oxide layer can be easily formed by thermal oxidation or the like.

Application 14

According to still another aspect of the invention, there is provided an electronic apparatus including the above-described optical element.

The electronic apparatus includes the above-described optical element can exhibit improved display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
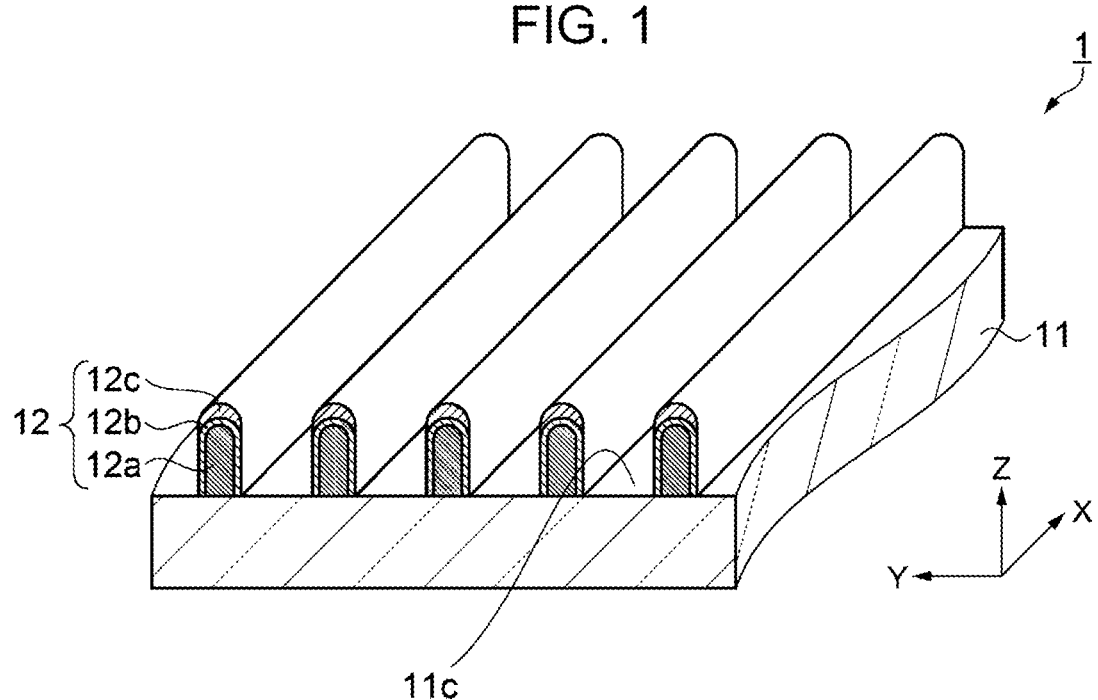
FIG. 1 is a schematic perspective view of a polarization element.

Some embodiments of the invention will be described below with reference to the drawings. For the sake of visibility, the dimensional proportions of the components or members in the drawings may be varied as needed.

First Embodiment

Polarization Element

Figure 2:
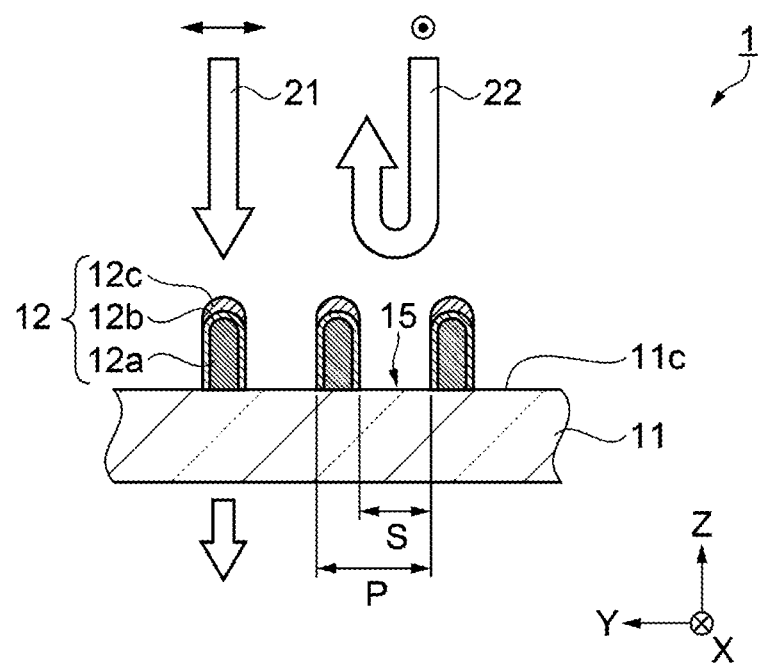
FIG. 2 is a fragmentary sectional view of the polarization element taken along a Y-Z plane.
Figure 3:
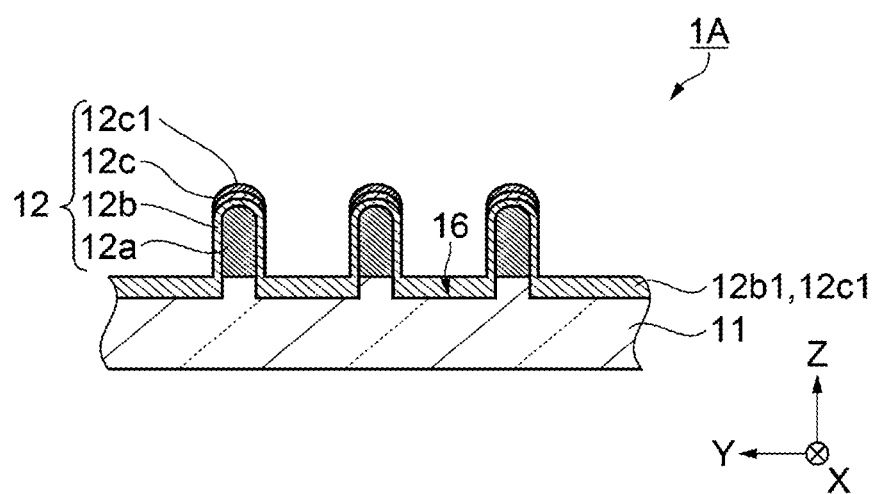
FIG. 3 is a fragmentary sectional view of a polarization element according to a first embodiment of the invention.

The structure of the polarization element according to a first embodiment will first be described with reference to FIGS. 1 to 3. FIG. 1 is a schematic perspective view of a polarization element. FIG. 2 is a fragmentary sectional view of the polarization element taken along a Y-Z plane. FIG. 3 is a fragmentary sectional view illustrating in detail a polarization element according to a first embodiment of the invention.

The drawings to which the following description refers are illustrated in an XYZ orthogonal coordinate system. The major parts of the polarization element are described with reference to the XYZ rectangular coordinate system. In the drawings, a plane parallel to the surface 11c of a substrate 11 on which a grid is formed is defined as the X-Y plane. The grid is defined by ribs 12, or bar members, extending in the X direction and arranged in the Y direction.

As shown in FIGS. 1 and 2, a polarization element 1 includes a substrate 11 and a grid defined by a plurality of ribs 12 arranged in a striped manner in plan view on the substrate 11. Each rib 12 of the grid includes a reflective reflection layer 12a, a dielectric layer 12b on the surface of the reflection layer 12a, and an absorbing layer 12c on the top of the dielectric layer 12b.

The substrate 11 is made of an optically transparent material, such as quartz or a plastic. The material is not particularly limited as long as it is optically transparent. In the present embodiment, the substrate 11 is made of glass. In some applications, heat is stored in the polarization element 1 and increases the temperature of the polarization element 1. Accordingly, a heat-resistant glass or quartz is advantageously used as the material of the substrate 11.

The reflection layer 12a is defined by a long, thin metal member extending in a direction on the substrate 11, and a plurality of reflection layers are arranged on the substrate 11 parallel to each other at a predetermined pitch. The reflection layer 12a may be made of a material having a high reflectance for visible light. More specifically, the material of the reflection layer 12a may be aluminum, silver, copper, chromium, titanium, nickel, tungsten, or iron. In the present embodiment, the reflection layer 12a is made of aluminum.

The dielectric layer 12b is disposed so as to cover the surfaces of the reflection layers 12a. The dielectric layer 12b is made of a metal oxide, desirably a material having a high optical transmittance for visible light, for example, a dielectric material such as aluminum oxide. The dielectric layer 12b can be formed by oxidizing the reflection layer 12a or by depositing a metal oxide layer, as will be described later.

The dielectric layer 12b acts as a barrier layer preventing the constituent elements of the reflection layer 12a and the absorbing layer 12c from mutually diffusing, and is optionally provided between the reflection layer 12a and the absorbing layer 12c.

The dielectric layer 12b may be made of any dielectric material as long as the material can form a barrier. For example, the dielectric layer 12b may be made of an oxide, a nitride or an oxynitride of silicon, aluminum, chromium, titanium, nickel, or tungsten.

The absorbing layer 12c is disposed on the dielectric layer 12b covering the reflection layers 12a and extends in the direction (X direction) in which the reflection layers 12a extend. The absorbing layer 12c is made of a material having a higher optical absorptance for visible light than the dielectric layer 12b. More specifically, the absorbing layer is made of at least one selected from the group consisting of silicon, germanium, and chromium. In the present embodiment, the material of the absorbing layer 12c is silicon.

Recessed portions 15 are formed, one each, between any two adjacent ribs 12 of the grid. The recessed portions 15 are arranged in the Y direction at substantially regular intervals with a period shorter than the wavelengths of visible light. Each layer of a polarization element 1A (FIG. 3) of the present embodiment has the following dimensions.

The height of the reflection layer 12a is, for example, about 180 nm. The width of the reflection layer 12a is, for example, about 40 nm. The thickness of the dielectric layer 12b on the reflection layer 12a is, for example, about 10 nm to 20 nm. The thickness of the absorbing layer 12c is, for example, 10 nm to 20 nm.

The interval, or space S, between any two adjacent ribs 12 of the grid is, for example, about 70 nm. The period, or pitch P, of the ribs 12 is, for example, 140 nm.

Since the ribs 12 of the grid have a multilayer structure including the reflection layer 12a, the dielectric layer 12b, and the absorbing layer 12c, the ribs 12 of the grid can transmit transverse-magnetic (TM) waves 21 that are polarized light (linearly polarized light) oscillating in a direction (Y direction) perpendicular to the direction in which the ribs 12 extend, and can absorb transverse-electric (TE) waves 22 that are polarized light (linearly polarized light) oscillating in the direction (X direction) in which the ribs 12 extend.

More specifically, the TE waves 22 that have entered the grid through the absorbing layer 12c are damped mainly by light absorption of the absorbing layer 12c and may also be damped by the dielectric layer 12b in some cases. The portion of the TE waves 22 that has passed through the dielectric layer 12b is reflected at the reflection layer 12a (acting as a part of a wire grid).

The reflected TE waves 22 pass through the dielectric layer 12b. At this time, the TE waves have a phase difference and are damped by interference and absorbed by the absorbing layer 12c. Thus, the grid has the effect of damping TE waves 22. Accordingly, the polarization element can separate polarized light components as desired by absorption. The transmittance of the grid for TE waves 22 may be, for example, 1% or less.

On the other hand, TM waves 21 are transmitted with a high transmittance of, for example, 80% or more. The contrast ratio defined by TM/TE is desirably 1000 or more.

As shown in FIG. 3, the polarization element 1A of the first embodiment has grooves 16 in the substrate 11 between any two adjacent ribs 12 of the grid. In each groove 16, an oxide film 12b1 or 12c1 of, for example, silicon oxide, is formed when the dielectric layer 12b or the absorbing layer 12c is formed.

Figure 4:
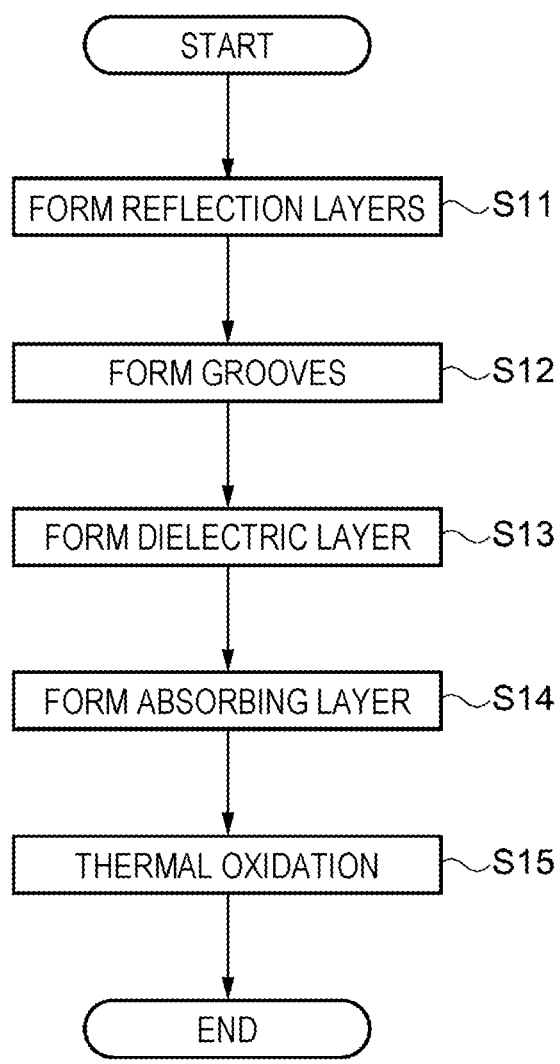
FIG. 4 is a flow diagram of a method for manufacturing a polarization element.

In the present embodiment, the grooves 16 are formed in the substrate 11 between the ribs 12 of the grid, and some film in the grooves is oxidized into an oxide film. Therefore, the portions between the ribs 12 are nearly transparent, and accordingly the optical transmittance of Method for Manufacturing Polarization Element A method for manufacturing the polarization element 1A of the first embodiment will now be described with reference to FIGS. 4 to 9. FIG. 4 is a flow diagram of the manufacturing method of the polarization element. FIGS. 5 to 9 are schematic sectional views each illustrating a specific step of the manufacturing method.

As shown in FIG. 4, the method for manufacturing the polarization element 1A of the first embodiment includes step S11 of forming reflection layers, step S12 of forming grooves, step S13 of forming a dielectric layer, step S14 of forming an absorbing layer, and step S15 of heat treatment.

Figure 5:
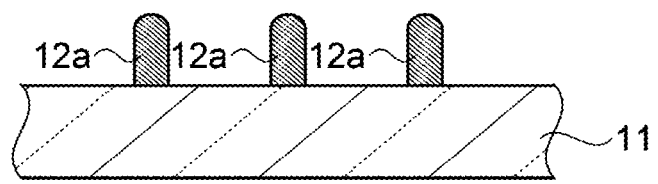
FIG. 5 is a schematic sectional view illustrating a specific step of the manufacturing method of the polarization element.

First, reflection layers 12a are formed as shown in FIG. 4 in Step S11. More specifically, first, aluminum is deposited on the substrate 11 by a known method. Subsequently, a resist pattern is formed by a two-beam interference exposure method, and the deposited aluminum film is patterned into wire grid reflection layers 12a by using the resist pattern as a mask. Thus, the reflection layers 12a are formed in a striped manner on the substrate 11, as shown in FIG. 5.

Figure 6:
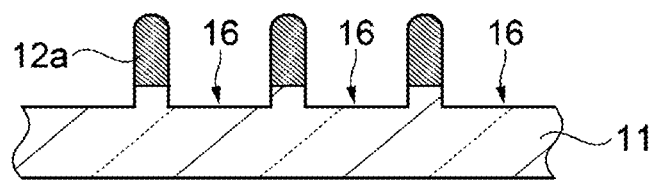
FIG. 6 is a schematic sectional view illustrating a specific step of the manufacturing method of the polarization element.

Then, in Step S12, grooves 16 are formed, as shown in FIG. 6. More specifically, the grooves 16 are formed in the substrate 11 between any two adjacent reflection layers 12a. This operation for forming the grooves 16 may be performed by, for example, dry etching of the substrate 11. The depth of the grooves 16 is preferably at least such that the oxide films 12b1 and 12c1, which will be formed later by oxidizing the dielectric layer 12b and the absorbing layer 12c, lie within the grooves below the height of the grooves.

Figure 7:
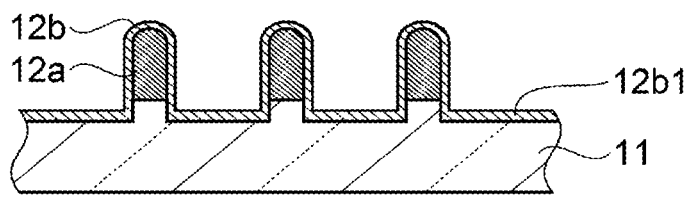
FIG. 7 is a schematic sectional view illustrating a specific step of the manufacturing method of the polarization element.

In Step S13, a dielectric layer 12b is formed. More specifically, the dielectric layer 12b is formed as shown in FIG. 7 by, for example, heating the substrate 11 to oxidize the surfaces of the reflection layers 12a. For this operation for heating the substrate 11, for example, atmospheric-pressure annealing may be performed in a heating furnace. The temperature for heating the substrate 11 may be 300° C.

The thickness of the dielectric layer 12b is about 10 nm to 20 nm as mentioned above. Thus, a dielectric layer 12b of aluminum oxide (AlOx) is formed over the surfaces of the reflection layers 12a.

Figure 8:
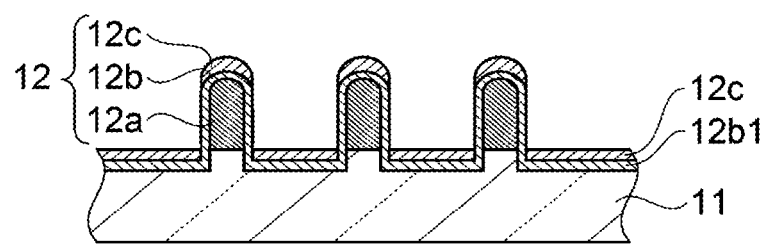
FIG. 8 is a schematic sectional view illustrating a specific step of the manufacturing method of the polarization element.

In Step S14, an absorbing layer 12c is formed. More specifically, the absorbing layer 12c is formed of silicon or the like on the dielectric layer 12b, as shown in FIG. 8, by a known magnetron sputtering method or the like. The thickness of the absorbing layer 12c is 10 nm to 20 nm as mentioned above.

Figure 9:
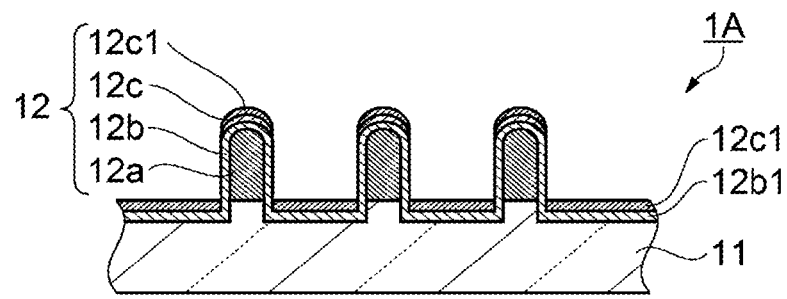
FIG. 9 is a schematic sectional view illustrating a specific step of the manufacturing method of the polarization element.

In Step S15, thermal oxidation is performed. More specifically, the substrate 11 is subjected to heat treatment so as to thermally oxidize the silicon remaining on the surface of the substrate 11 between the ribs 12 of the grid into silicon oxide ($SiO_2$), as shown in FIG. 9. Thus, the silicon film between the ribs 12 can be oxidized through this operation although the surface of the absorbing layer 12b is partially oxidized into an oxide film 12c1.

In this manufacturing method, the film between the ribs of the ribs 12 is oxidized into oxide film 12c1. Thus, the resulting film is nearly transparent, and accordingly the optical transmittance of the grid does not decrease between the ribs 12. The polarization element 1A is thus completed.

Electronic Apparatus

Figure 10:
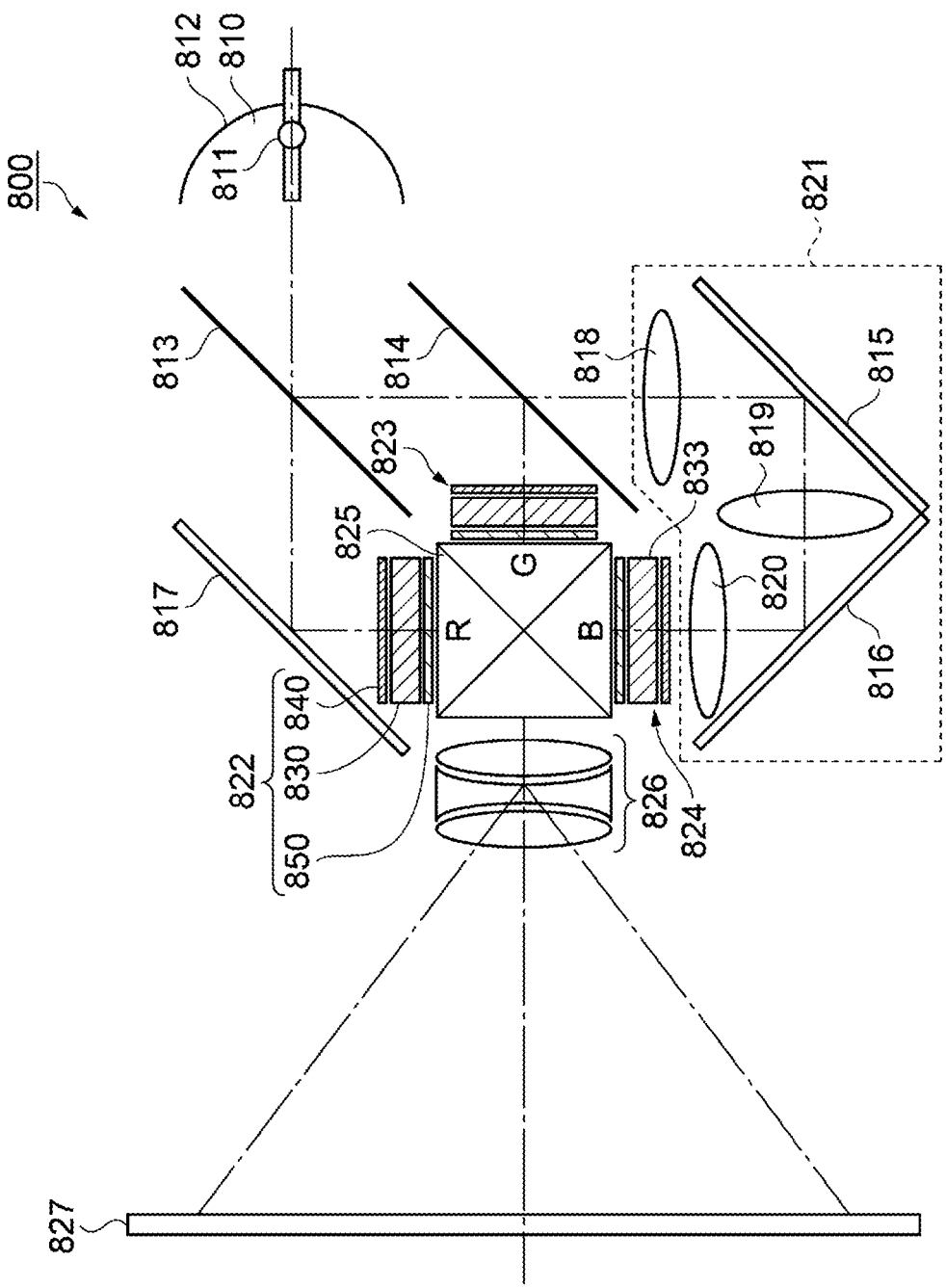
FIG. 10 is a schematic diagram of a projector incorporating an embodiment of the electronic apparatus according to the invention.

An electronic apparatus according to an embodiment of the invention will now be described with reference to FIG. 10. FIG. 10 is a schematic diagram of a projector incorporating an embodiment of the electronic apparatus.

As shown in FIG. 10, the projector 800 includes a light source 810, dichroic mirrors 813 and 814, reflection mirrors 815, 816, and 817, an entrance lens 818, a relay lens 819, an emission lens 820, optical modulators 822, 823, and 824, a cross dichroic prism 825, and a projection lens 826.

The light source 810 includes a lamp 811, such as a metal halide lamp, and a reflector 812 capable of reflecting the light emitted from the lamp. The light source 810 may be an ultrahigh-pressure mercury-vapor lamp, a mercury flash lamp, a high-pressure mercury-vapor lamp, a deep UV lamp, a xenon lamp, a xenon flash lamp, or the like, instead of the metal halide lamp.

The dichroic mirror 813 transmits the red component of white light emitted from the light source 810 and reflects the blue and green components of the white light. The red component transmitted through the dichroic mirror is reflected to the optical modulator 822 of red light from the reflection mirror 817. The green component of the blue and green components reflected from the dichroic mirror 813 is reflected to the optical modulator 823 of green light from the dichroic mirror 814. The blue component is transmitted through the dichroic mirror 814 and enters the optical modulator 824 of blue light through an optical relay system 821 adapted to prevent light from being lost through a long optical path and including the entrance lens 818, the relay lens 819, and the emission lens 820.

Each of the optical modulators 822, 823, and 824 includes polarization elements 840 and 850 with a liquid crystal light valve 830 therebetween. The above-described polarization element 1 (1A) is used as the polarization elements 840 and 850. The polarization element 840 is disposed on the optical path of the light emitted from the light source 810, between the light source 810 and the liquid crystal light valve 830. The polarization element 850 is disposed on the optical path of the light that has passed through the liquid crystal light valve 830, between the liquid crystal light valve 830 and the projection lens 826. The transmission axes of the polarization elements 840 and 850 are perpendicular to each other; hence the polarization elements are in a cross-Nicol arrangement.

The polarization elements 840 and 850 used in the projector 800 of the present embodiment are made of a heat-resistant inorganic material, and the deterioration of the polarization elements 840 and 850 is suppressed.

The three color light components modulated by the respective optical modulators 822, 823, and 824 enter the cross dichroic prism 825. The cross dichroic prism 825 is composed of four right-angle prisms bonded together, and a dielectric multilayer film capable of reflecting the red light component and a dielectric multilayer film capable of reflecting the blue light component are formed in an X-shaped manner at the interfaces of the four prisms. The three color light components are synthesized into a light forming a color image by the dielectric multilayer films. The synthesized light is projected on a screen 827 through the projection lens 826, or projection optical system, thus forming an enlarged image.

The projector 800 that is a type of electronic apparatus includes the polarization element 1 of the above-described embodiment and, therefore, can exhibit good reliable performance to display images.

The electronic apparatus including the above-described polarization element 1 can be embodied as any one of a variety of apparatuses, such as head-mounted displays (HMD), head-up displays (HUD), smartphones, electrical view finders (EVF), cellular phones, mobile computers, digital cameras, digital video cameras, automotive equipment, and lighting devices, in addition to the projector 800.

Optical Properties

Figure 11:
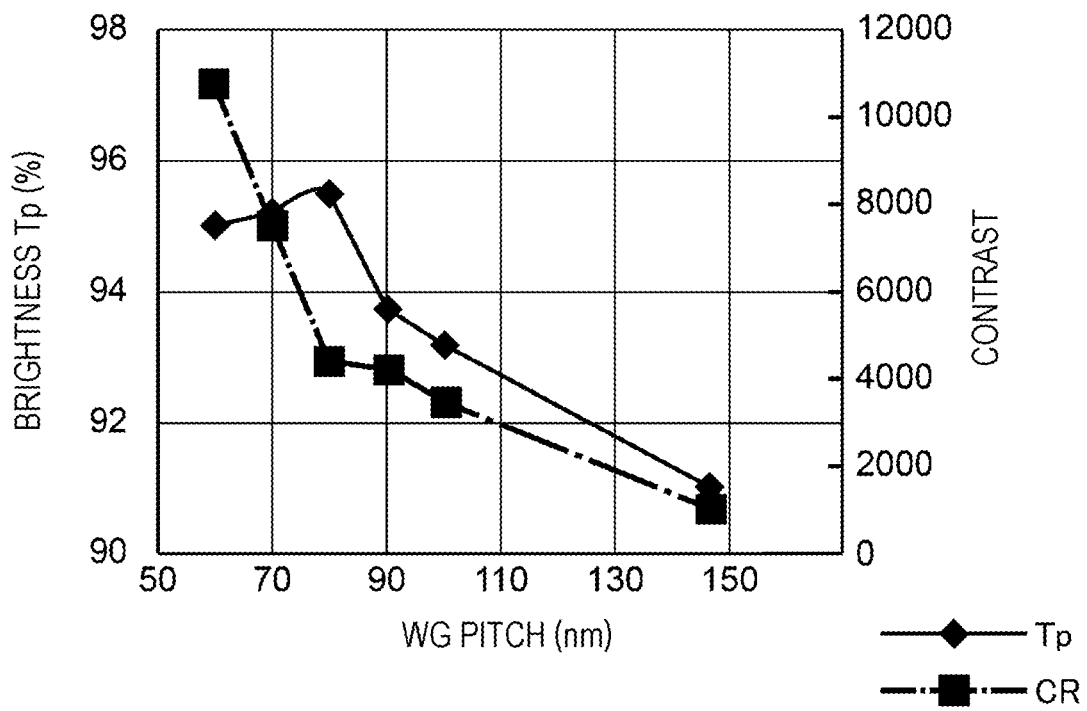
FIG. 11 is a plot illustrating the relationships between the pitch of the grid and brightness and between the pitch of the grid and contrast ratio.
Figure 12:
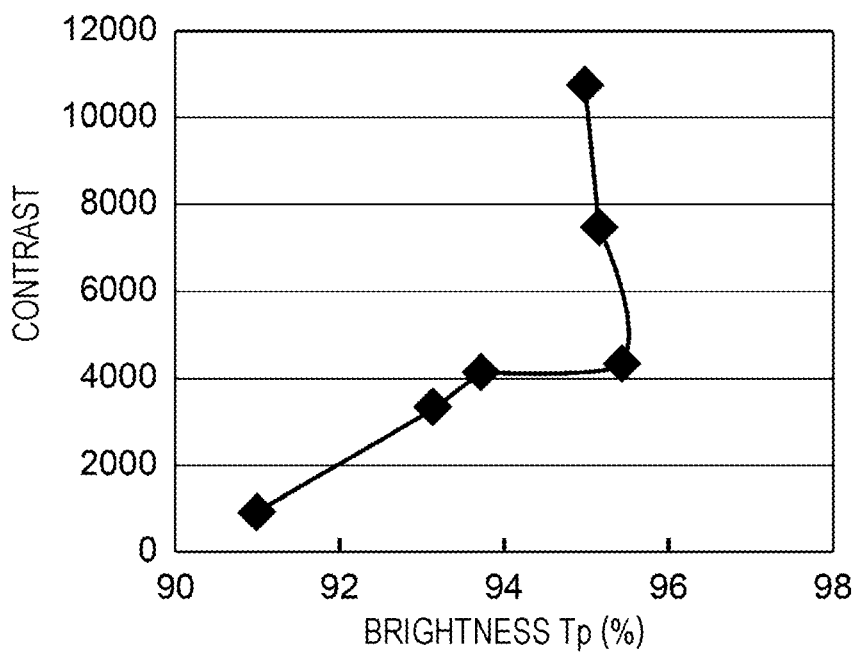
FIG. 12 is a plot illustrating the relationship between brightness and contrast ratio.

The optical properties of the polarization element according to the present embodiment will be described below with reference to FIGS. 11 and 12. FIG. 11 is a plot illustrating the relationships between the pitch of the grid (WG) and brightness and between the pitch of the grid and contrast. FIG. 12 is a plot illustrating the relationship between brightness and contrast.

The measurements of brightness and contrast were performed under the assumption that the polarization element would be used as the polarization element of a light valve in the above-described projector 800. The polarization element 1 according to an embodiment of the invention is made of inorganic materials and is highly resistant to heat. Accordingly, the polarization element can be used as a polarizer of the above-described projector 800 including a high-power light source.

In the plot shown in FIG. 11, the horizontal axis represents the pitch (nm) of the grid ribs 12, which was varied from 50 nm to 150 nm. The vertical axis on the left side represents brightness Tp (%) in the range of 90% to 98%. The vertical axis on the right side represents contrast ratio in the range of 0 to 12000.

As shown in FIG. 11, brightness increases as the pitch of the grid ribs 12 is reduced. This relationship is however reversed at a pitch of about 80 nm, and brightness decreases as the pitch is reduced.

Similarly, contrast ratio increases as the pitch is reduced. It is difficult to determine the peak value of the contrast ratio within the range shown in FIG. 11. This plot suggests that the pitch of the grid ribs 12 relates greatly to brightness and contrast.

In the plot shown in FIG. 12, the horizontal axis represents brightness Tp (%) in the range of 90% to 98%. The vertical axis represents contrast ratio in the range of 0 to 12000.

As shown in FIG. 12, brightness reaches the peak value of 96% at a contrast ratio of about 4000. When the contrast ratio is increased to 12000 from 4000, however, the brightness decreases.

Desirably, the pitch of the grid ribs 12 is set according to the processing precision, usage environment and purpose of the grid.

The first embodiment including the polarization element 1A, the manufacturing method of the polarization element 1A, and the electronic apparatus produces the following effects.

(1) According to the polarization element 1A of the first embodiment and the method for manufacturing the polarization element, the dielectric layer 12b and the absorbing layer 12c are formed after the reflection layers 12a have been formed. This process can reduce variation in etching amount resulting from the difference in etching rate between materials compared to the case of forming the reflection layers 12a, the dielectric layer 12b, and the absorbing layer 12c at one time by etching a multilayer composite including these layers. Thus, the grid ribs 12, each including the striped reflection layer 12a, the dielectric layer 12b, and the absorbing layer 12c can be regularly arranged. Consequently, contrast and brightness are improved. Also, the films between the grid ribs 12 are oxidized into oxide films 12b1 and 12c1. Consequently, the optical transmittance of the grid does not decrease between the ribs.

(2) According to the polarization element 1A of the first embodiment and the method for manufacturing the polarization element 1A, grooves 16 are formed in the substrate 11 between the grid ribs 12, and a film in the grooves 16 is oxidized into an oxide film 12c1. The portions between the grid ribs 12 are therefore nearly transparent. The decrease in optical transmittance between the grid ribs 12 is thus prevented.

(3) In the manufacturing method of the first embodiment, the polarization element 1A can be produced by using a conventional technique, such as a vacuum process, sputtering, or photolithography. The method of the first embodiment increases productivity. In addition, manufacturing cost can be reduced.

(4) The projector 800 of the first embodiment, which includes the polarization element 1A of the first embodiment, can be an electronic apparatus that can exhibit improved display quality.

Second Embodiment

Polarization Element

Figure 13:
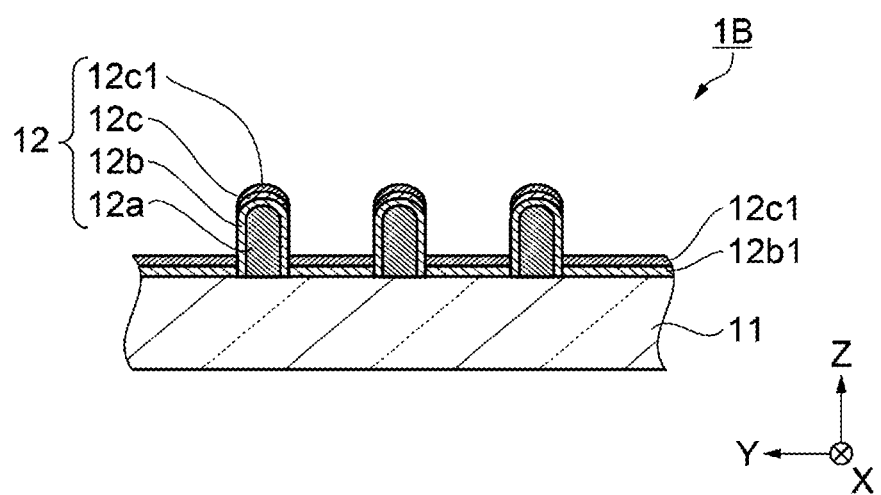
FIG. 13 is a fragmentary sectional view of the polarization element according to a second embodiment of the invention.

The structure of the optical element according to a second embodiment will now be described with reference to FIG. 13. FIG. 13 is a fragmentary sectional view of a polarization element according to the second embodiment of the invention.

The polarization element 1B of the second embodiment is different from the polarization element 1A of the first embodiment in that grooves 16 are not formed in the substrate 11. Except for this difference, the structures of these two polarization elements are substantially the same. In the second embodiment, therefore, different points from the first embodiment will be described, and other points are omitted.

As shown in FIG. 13, the polarization element 1B includes a substrate 11 and a grid defined by a plurality of ribs arranged in a striped manner in plan view on the substrate 11 and is thus similar to the polarization element 1A of the first embodiment. Each rib 12 of the grid includes a reflection layer 12a, a dielectric layer 12b on the surface of the reflection layer 12a, and an absorbing layer 12c on the top of the dielectric layer 12b.

Unlike the first embodiment, grooves 16 are not formed between any two adjacent grid ribs 12. The portions of the substrate between the grid ribs 12 are each provided thereon with an oxide film 12c1 of, for example, silicon oxide formed by forming the dielectric layer 12b and the absorbing layer 12c.

Method for Manufacturing Polarization Element

Figure 14:
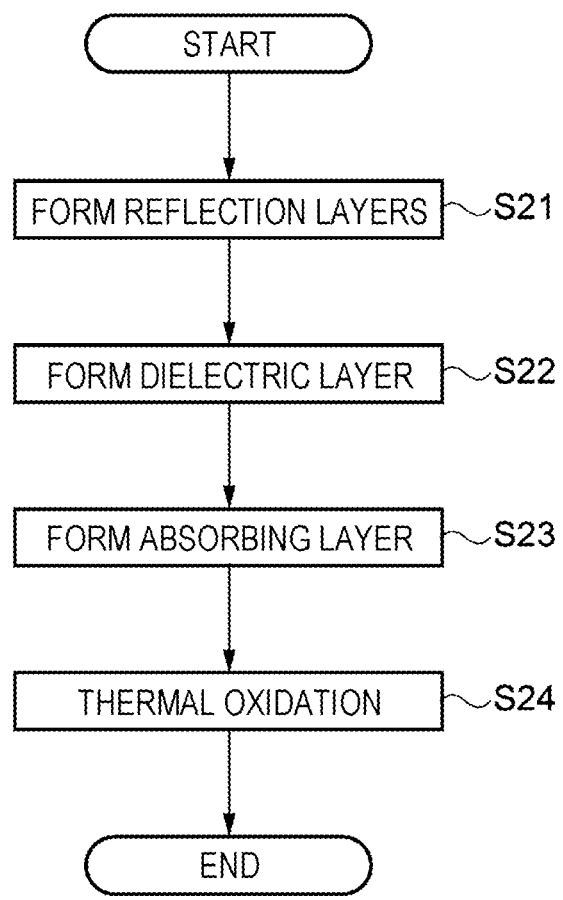
FIG. 14 is a flow diagram of a method for manufacturing a polarization element.

A method for manufacturing the polarization element 1B of the second embodiment will now be described with reference to FIGS. 14 to 18. FIG. 14 is a flow diagram of the manufacturing method of the polarization element. FIGS. 15 to 18 are schematic sectional views each illustrating a specific step of the manufacturing method.

As shown in FIG. 14, the method for manufacturing the polarization element 1B of the second embodiment includes step S21 of forming reflection layers, step S22 of forming a dielectric layer, step S23 of forming an absorbing layer, and step S24 of heat treatment.

Figure 15:
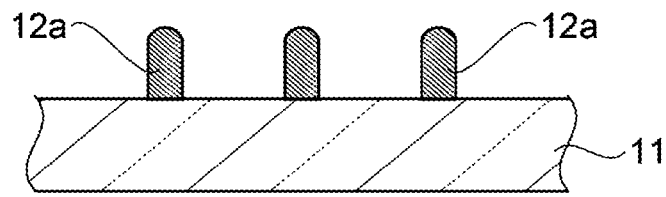
FIG. 15 is a schematic sectional view illustrating a specific step of the manufacturing method of the polarization element.

In Step S21, reflection layers 12a are formed as shown in FIG. 15. More specifically, wire grid reflection layers 12a are formed of aluminum or the like by a two-beam interference exposure method, as in the first embodiment.

Figure 16:
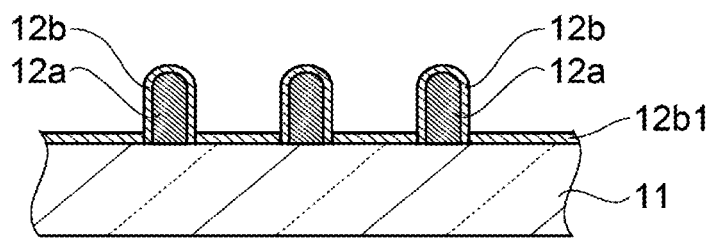
FIG. 16 is a schematic sectional view illustrating a specific step of the manufacturing method of the polarization element.

In Step S22, a dielectric layer 12b is formed. More specifically, the dielectric layer 12b is formed by, for example, heating the substrate 11 to oxidize the surfaces of the reflection layers 12a, as shown in FIG. 16. The heating is performed in the same manner as in the first embodiment. Thus, a dielectric layer 12b of aluminum oxide (AlOx) is formed over the surfaces of the reflection layers 12a.

Figure 17:
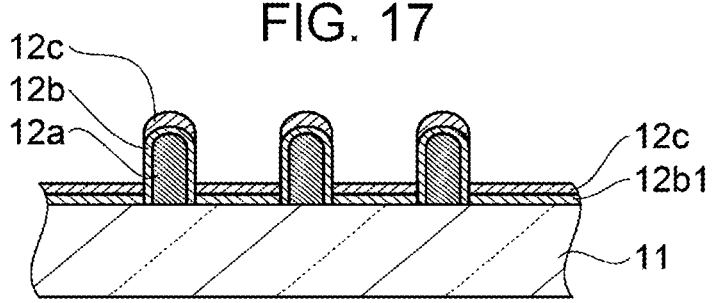
FIG. 17 is a schematic sectional view illustrating a specific step of the manufacturing method of the polarization element.

In Step S23, an absorbing layer 12c is formed. More specifically, the absorbing layer 12c is formed of silicon or the like on the dielectric layer 12b, as shown in FIG. 17, by a known magnetron sputtering method or the like.

Figure 18:
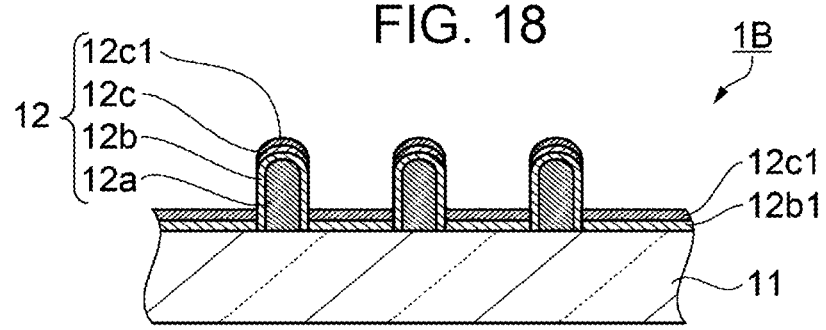
FIG. 18 is a schematic sectional view illustrating a specific step of the manufacturing method of the polarization element.

In Step S24, thermal oxidation is performed. More specifically, the substrate 11 is subjected to heat treatment so as to oxidize the silicon remaining on the surface of the substrate 11 between the ribs 12 of the grid into silicon oxide ($SiO_2$), as shown in FIG. 18. Polarization element 1B is thus completed.

The second embodiment including the polarization element 1B and the manufacturing method thereof produces the following effects.

(5) In the polarization element 1B of the second embodiment, oxide films 12c1 and 12b1 are formed without forming grooves 16 between the ribs of the grid 12. The number of steps in the manufacturing process is reduced, and accordingly the cost in manufacture can be reduced.

Third Embodiment

Method for Manufacturing Polarization Element

Figure 19:
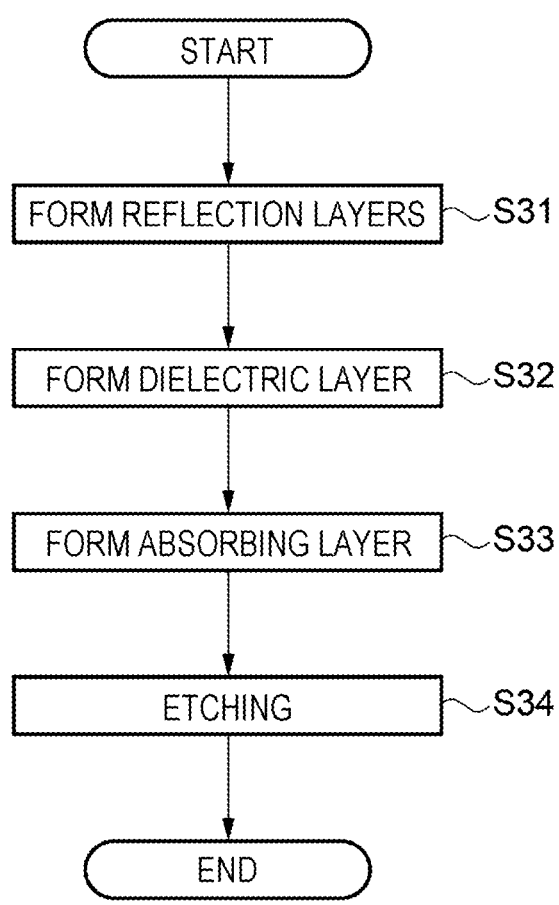
FIG. 19 is a flow diagram of a method for manufacturing a polarization element.
Figure 20:
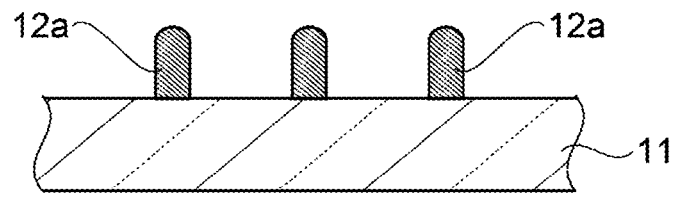
FIG. 20 is a schematic sectional view illustrating a specific step of the manufacturing method of the polarization element.
Figure 21:
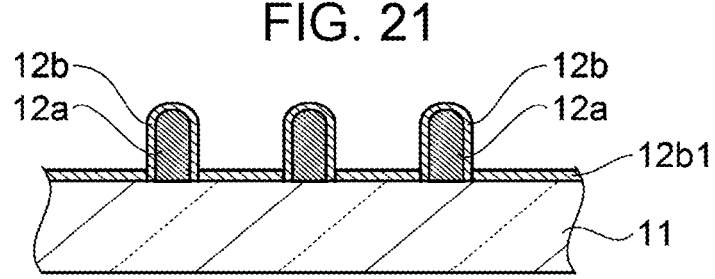
FIG. 21 is a schematic sectional view illustrating a specific step of the manufacturing method of the polarization element.
Figure 22:
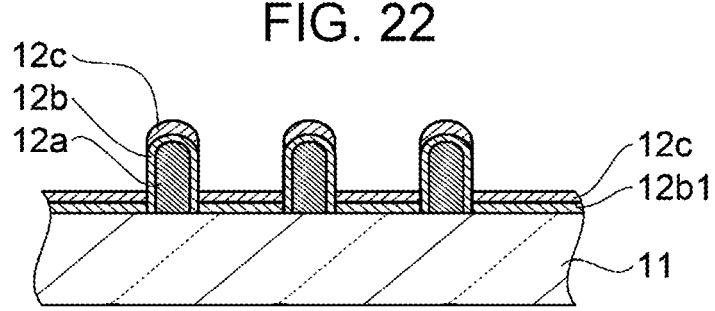
FIG. 22 is a schematic sectional view illustrating a specific step of the manufacturing method of the polarization element.

A method for manufacturing the polarization element 1C of the third embodiment will now be described with reference to FIGS. 19 to 23. FIG. 19 is a flow diagram of the manufacturing method of the polarization element. FIGS. 20 to 23 are schematic sectional views each illustrating a specific step of the manufacturing method.

The polarization element 1C of the third embodiment has the same structure as the polarization element 1 shown in FIG. 1. Polarization element 1C is formed by substantially the same manufacturing method as in the second embodiment, except that etching is performed instead of thermal oxidation. In the third embodiment, therefore, different points (manufacturing method) from the second embodiment will be described, and other points are omitted.

As shown in FIG. 19, the method for manufacturing the polarization element 1C of the third embodiment includes step S31 of forming reflection layers, step S32 of forming a dielectric layer, step S33 of forming an absorbing layer, and step S34 of etching.

Steps S31 to S33 (FIGS. 20 to 22) are the same as Steps S21 to S23 (FIGS. 15 to 17) in the second embodiment. However, Step S32 of forming a dielectric layer 12b may be performed by sputtering.

Figure 23:
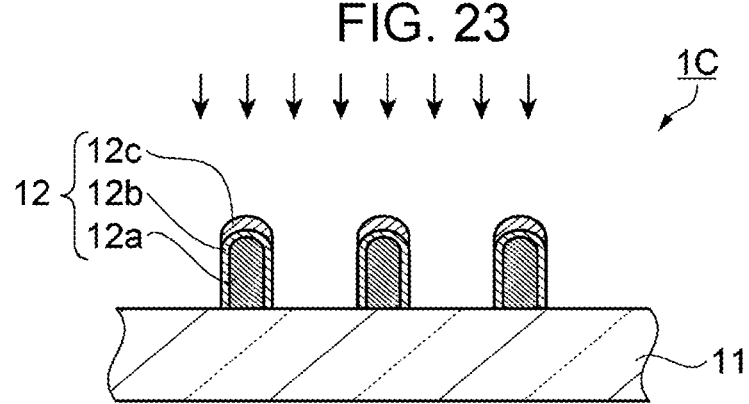
FIG. 23 is a schematic sectional view illustrating a specific step of the manufacturing method of the polarization element.

In Step S34, etching is performed. More specifically, the residue (oxide film 12b1 and absorbing layer 12c) on the substrate 11 between the ribs 12 of the grid is removed by etching, as shown in FIG. 23. For this etching, for example, $Cl_2$ gas or $CF_4$ gas is used. Thus, the surface of the substrate is exposed between the ribs 12 of the grid, and polarization element 1C is completed.

The third embodiment including the polarization element 1C and the manufacturing method thereof produces the following effects in addition to the effects of the first and the second embodiment.

(6) In the polarization element 1C of the third embodiment, the film on the substrate 11 between the ribs 12 of the grid is moved. Accordingly, the optical transmittance is increased compared to the case where oxide film lies between the ribs 12 of the grid.

The invention is not limited to the disclosed embodiments, and various modifications may be made within the scope and spirit of the invention as set forth in or understood from the appended claims and the description of the Specification. The embodiments may be modified as below.

Modification 1

The grid may be made up of, for example, reflection layers 12a and an absorbing layer 12c without being limited to the structure including reflection layers 12a, a dielectric layer 12b, and an absorbing layer 12c.

Modification 2

The oxide film between the grid ribs 12 are not always formed by thermal oxidation and may be formed by using any other technique such as chemical reaction.

What is claimed is:

1. An optical element comprising:
   a substrate;
   a plurality of reflection layers on one side of the substrate, the plurality of reflection layers being arranged in a striped manner in a plan view;
   an absorbing layer disposed on a side of the plurality of reflection layers opposite the substrate;
   a first oxide film covering the absorbing layer and portions between any two adjacent reflection layers included in the plurality of reflection layers, the first oxide film being made of an oxide of a material contained in the absorbing layer; and
   a second oxide film that covers the portions between the any two adjacent reflection layers and is disposed between the first oxide film and the substrate, the second oxide film made of an additional oxide of an additional material contained in the substrate.

2. The optical element according to claim 1, wherein the substrate has grooves therein between the any two adjacent reflection layers, and the first oxide film and the second oxide film at least in part lie in the grooves.

3. The optical element according to claim 1, further comprising a dielectric layer between each reflection layer included in the plurality of reflection layers and the absorbing layer.

4. The optical element according to claim 1, wherein each reflection layer included in the plurality of reflection layers contains at least one material selected from the group consisting of aluminum, silver, copper, chromium, titanium, nickel, tungsten, and iron.

5. The optical element according to claim 1, wherein the absorbing layer contains at least one material selected from the group consisting of silicon, germanium, and chromium.

6. The optical element according to claim 3, wherein the dielectric layer is made of silicon oxide.

7. An electronic apparatus comprising the optical element as set forth in claim 1.

8. An electronic apparatus comprising the optical element as set forth in claim 2.

9. An electronic apparatus comprising the optical element as set forth in claim 3.

10. The optical element according to claim 1, wherein at least part of the second oxide film is made of an oxide of a material contained in the plurality of reflection layers.

11. The optical element according to claim 1, wherein the second oxide film is disposed between the plurality of reflection layers and the absorbing layer and is in contact with the first oxide film in an area between the any two adjacent reflection layers.

* * * * *